(12) United States Patent
Krawinkel et al.

(10) Patent No.: US 10,040,975 B2
(45) Date of Patent: Aug. 7, 2018

(54) PRESSURE-SENSITIVE ADHESIVE STRIP FOR MOISTURE-INSENSITIVE PEELABLE ADHESIVE BONDS

(71) Applicant: TESA SE, Norderstedt (DE)

(72) Inventors: Thorsten Krawinkel, Hamburg (DE); Andreas Junghans, Hamburg (DE)

(73) Assignee: TESA SE, Norderstedt (DE)

( * ) Notice: Subject to any disclaimer, the term of this patent is extended or adjusted under 35 U.S.C. 154(b) by 418 days.

(21) Appl. No.: 15/009,003

(22) Filed: Jan. 28, 2016

(65) Prior Publication Data

US 2016/0145471 A1 May 26, 2016

Related U.S. Application Data

(62) Division of application No. 12/377,555, filed as application No. PCT/EP2007/058296 on Aug. 10, 2007.

(30) Foreign Application Priority Data

Aug. 18, 2006 (DE) .................. 10 2006 038 719

(51) Int. Cl.
*B32B 7/06* (2006.01)
*C09J 7/02* (2006.01)
(Continued)

(52) U.S. Cl.
CPC ............. *C09J 7/0221* (2013.01); *B32B 5/04* (2013.01); *B32B 43/006* (2013.01); *C09J 7/26* (2018.01);
(Continued)

(58) Field of Classification Search
CPC .................. C09J 2201/134; C09J 2201/618
See application file for complete search history.

(56) References Cited

U.S. PATENT DOCUMENTS

| 2,676,182 A | 4/1954 | Daudt et al. |
| 3,627,851 A | 12/1971 | Brady |

(Continued)

FOREIGN PATENT DOCUMENTS

| DE | 33 31 016 A1 | 10/1984 |
| DE | 42 22 849 C1 | 6/1993 |

(Continued)

OTHER PUBLICATIONS

Figure 2 A Reproduced From U.S. Pat. No. 6,004,642, patent published on Dec. 21, 1999.

(Continued)

*Primary Examiner* — Scott W Dodds
(74) *Attorney, Agent, or Firm* — Norris McLaughlin & Marcus P.A.

(57) ABSTRACT

A method of separating two substrates bonded with a redetachable, at least single-sidedly pressure-sensitive adhesive strip composed at least of a) a core layer which has a breaking extension of at least 300%, b) an outer carrier layer which has a breaking extension of not more than 120% and which at least sectionally is connected to the core layer such that it separates from the core layer when the latter is extensionally stretched, and c) a first adhesive layer which is applied at least sectionally to the side of the outer carrier layer that is opposite the side connected to the core layer, in which the core layer is stretched in the direction of the bond plane, starting from a region which has been made nonadhesive, until the core layer releases from at least one of the outer carrier layers so that the two substrates are separated from one another.

15 Claims, 7 Drawing Sheets

(51) Int. Cl.
  *B32B 5/04* (2006.01)
  *B32B 43/00* (2006.01)
  *C09J 7/38* (2018.01)
  *C09J 7/26* (2018.01)
  *C09J 7/29* (2018.01)
  *C09J 153/02* (2006.01)
  *C09J 183/04* (2006.01)

(52) U.S. Cl.
  CPC .............. *C09J 7/29* (2018.01); *C09J 7/381* (2018.01); *C09J 7/387* (2018.01); *C09J 153/02* (2013.01); *C09J 183/04* (2013.01); *C09J 2201/134* (2013.01); *C09J 2201/162* (2013.01); *C09J 2201/606* (2013.01); *C09J 2201/61* (2013.01); *C09J 2201/618* (2013.01); *C09J 2400/243* (2013.01); *C09J 2423/105* (2013.01); *C09J 2453/00* (2013.01); *C09J 2467/006* (2013.01); *C09J 2483/00* (2013.01); *Y10T 156/1142* (2015.01); *Y10T 428/249983* (2015.04); *Y10T 428/2848* (2015.01)

(56) References Cited

U.S. PATENT DOCUMENTS

| | | |
|---|---|---|
| 4,024,312 A | 5/1977 | Korpman |
| 5,110,890 A | 5/1992 | Butler |
| 5,409,189 A | 4/1995 | Luehmann |
| 5,491,012 A | 2/1996 | Luhmann et al. |
| 5,507,464 A | 4/1996 | Hamerski et al. |
| 5,626,931 A | 5/1997 | Luehmann et al. |
| 5,626,932 A | 5/1997 | Luehmann et al. |
| 5,672,402 A | 9/1997 | Kreckel et al. |
| 5,897,949 A | 4/1999 | Luehmann et al. |
| 5,925,459 A | 7/1999 | Zimmermann et al. |
| 5,967,474 A | 10/1999 | Doconto et al. |
| 6,001,471 A | 12/1999 | Bries et al. |
| 6,004,642 A | 12/1999 | Langford |
| 6,004,665 A | 12/1999 | Luehmann et al. |
| 6,086,973 A | 7/2000 | Hazes |
| 6,106,953 A | 8/2000 | Zimmermann et al. |
| 6,280,840 B1 | 8/2001 | Luehmann et al. |
| 6,284,378 B1 | 9/2001 | Junghans et al. |
| 6,342,720 B1 | 1/2002 | Presting et al. |
| 6,372,335 B1 | 4/2002 | Luehmann et al. |
| 6,395,389 B1 | 5/2002 | Luhmann et al. |
| 6,403,206 B1* | 6/2002 | Bries ............... A47G 1/175 428/220 |
| 6,413,626 B1 | 7/2002 | Wollner |
| 6,544,639 B1 | 4/2003 | Luhmann et al. |
| 6,569,521 B1 | 5/2003 | Sheridan et al. |
| 6,874,740 B1 | 4/2005 | Leiber et al. |
| 8,128,781 B2 | 3/2012 | Krawinkel et al. |
| 8,721,832 B2 | 5/2014 | Krawinkel et al. |
| 2002/0173590 A1 | 2/2002 | Luhmann et al. |
| 2002/0034628 A1 | 3/2002 | Luhmann et al. |
| 2002/0168516 A1 | 11/2002 | Luhmann et al. |
| 2003/0049439 A1* | 3/2003 | Johansson ......... B65D 63/1009 428/343 |
| 2003/0091801 A1 | 5/2003 | Mizuno et al. |
| 2004/0092663 A1 | 5/2004 | Krawinkel |
| 2005/0256254 A1 | 11/2005 | Luhmann et al. |
| 2011/0020640 A1 | 1/2011 | Sherman et al. |

FOREIGN PATENT DOCUMENTS

| | | |
|---|---|---|
| DE | 42 33 872 A1 | 3/1994 |
| DE | 44 28 587 A1 | 2/1996 |
| DE | 44 31 914 A1 | 3/1996 |
| DE | 195 11 288 A1 | 10/1996 |
| DE | 195 31 696 A1 | 3/1997 |
| DE | 196 49 636 A1 | 6/1998 |
| DE | 196 49 727 A1 | 6/1998 |
| DE | 196 49 728 A1 | 6/1998 |
| DE | 196 49 729 A1 | 6/1998 |
| DE | 297 23 198 U1 | 8/1998 |
| DE | 197 08 364 A1 | 9/1998 |
| DE | 197 20 145 A1 | 11/1998 |
| DE | 197 23 177 A1 | 12/1998 |
| DE | 197 56 816 C1 | 2/1999 |
| DE | 197 56 084 A1 | 7/1999 |
| DE | 198 20 854 C1 | 8/1999 |
| DE | 198 42 864 A1 | 3/2000 |
| DE | 198 42 865 A1 | 3/2000 |
| DE | 100 03 318 A1 | 8/2001 |
| DE | 102 24 842 A1 | 12/2003 |
| EP | 0 957 146 A1 | 11/1999 |
| EP | 0 816 458 B1 | 9/2002 |
| EP | 0 816 459 B1 | 9/2002 |
| EP | 0 885 571 B1 | 8/2003 |
| EP | 0 878 525 B1 | 9/2003 |
| WO | 92/01132 A1 | 1/1992 |
| WO | 92/211333 A1 | 7/1992 |
| WO | 94/21157 A1 | 9/1994 |
| WO | 95/06691 A1 | 3/1995 |
| WO | 97/07172 A1 | 2/1997 |
| WO | 98/03601 A1 | 1/1998 |
| WO | 99/31193 A1 | 6/1999 |
| WO | 99/37729 A1 | 6/1999 |
| WO | 99/63018 A1 | 12/1999 |
| WO | 01/66664 A2 | 9/2001 |
| WO | 02/04571 A1 | 1/2002 |
| WO | 02/057383 A1 | 7/2002 |

OTHER PUBLICATIONS

Richard J. Lewis, Sr., "Hawley's Condensed Chemical Dictionary", 2007, John Wiley & Sons, Inc., 5th edition, p. 705.

* cited by examiner

PRESSURE-SENSITIVE ADHESIVE STRIP FOR MOISTURE-INSENSITIVE PEELABLE ADHESIVE BONDS

This is a Division of U.S. application Ser. No. 12/377,555 filed May 27, 2011, now abandoned, which is a 371 of PCT/EP2007/058296 filed Aug. 10, 2007, claiming priority of German Application 10 2006 038 719.8 filed Aug. 18, 2006, the disclosure of which is incorporated herein by reference The invention relates to an adhesive strip which is pressure-sensitively adhesive in particular on both sides and which can be detached again without residue or destruction in two steps, by extensional stretching in the bond plane and subsequent peeling. The invention further relates to the use of the adhesive strip of the invention and also to methods of detaching the adhesive strip.

BACKGROUND OF THE INVENTION

Highly elastically or plastically extensible pressure-sensitive adhesive strips which can be detached again without residue or destruction by extensional stretching in the bond plane are known from, for example, U.S. Pat. No. 4,024,312 A, DE 33 31 016 C2, WO 92/01132 A1, WO 92/11333 A1, DE 42 22 849 A1, WO 95/06691 A1, DE 195 31 696 A1, DE 196 26 870 A1, DE 196 49 727 A1, DE 196 49 728 A1, DE 196 49 729 A1, DE 197 08 364 A1, DE 197 20 145 A1, DE 198 20 854 A1, WO 99/37729 A1, and DE 100 03 318 A1, and are referred to inter alia below as strippable pressure-sensitive adhesive strips.

Strippable self-adhesive tapes of this kind are frequently used in the form of single-sidedly or double-sidedly pressure-sensitive adhesive-sheet strips, which preferably have a nonadhesive grip region, from which the detachment operation is initiated.

Particular applications of such pressure-sensitive adhesive strips are found in DE 42 33 872 A1, DE 195 11 288 A1, U.S. Pat. No. 5,507,464 A, U.S. Pat. No. 5,672,402 A, and WO 94/21157 A1; specific embodiments are described in, for example, DE 44 28 587 A1, DE 44 31 914 A1, WO 97/07172 A1, DE 196 27 400 A1, WO 98/03601 A1, and DE 196 49 636 A1, DE 197 20 526 A1, DE 197 23 177 A1, DE 297 23 198 A1, DE 197 26 375 A1, DE 197 56 084 A1, DE 197 56 816 A1, DE 198 42 864 A1, DE 198 42 865 A1, WO 99/31193 A1, WO 99/37729 A1, and WO 99/63018 A1.

Fields of use of the aforementioned strippable pressure-sensitive adhesive strips include in particular the residuelessly and nondestructively redetachable fixing of light to moderately heavy articles in the home, workplace, and office segments. In these applications they replace conventional fastening means such as, for example, drawing pins, roundhead needles, thumb tacks, nails, screws, conventional self-adhesive tapes, and liquid adhesives. Key to the successful use of the pressure-sensitive adhesive strips is not only the possibility of residueless and nondestructive redetachment of bonded articles but also their quick and easy bonding and also their secure hold for the envisioned period of bonding. It should be borne in mind in particular here that the adhesive strips must function on a large number of substrates in order to be able to serve as a universal fixing in the home, workplace, and office segments.

Despite the fact that the literature cited above describes a broad range of pressure-sensitive adhesives for use in strippable self-adhesive tapes, commercial products currently on the market (for example, Tesa® Powerstrips® from tesa AG, 3M Command® adhesive strips from 3M, and Plastofix® Formule Force 1000 adhesive strips from Plasto S.A.) virtually without exception have pressure-sensitive adhesives based on styrene block copolymers with unsaturated polydiene blocks in the elastomer block.

These products based on the styrene block copolymers exhibit weaknesses in bond strength under the influence of atmospheric humidity or water. This behavior is particularly pronounced when bonds are made on hydrophilic substrates such as glass or ceramic. Particularly in the case of moisture exposure shortly after the bonding of moderately heavy articles, failure of the pressure-sensitive adhesive strips is a frequent occurrence. The holding power under the influence of moisture is reduced in particular in those pressure-sensitive adhesive strips which comprise nonpolar tackifier resins such as hydrocarbon resins or polyter-gene resins.

In the case of products comprising an intermediate foam carrier to which adhesive is applied on both sides, the reduction in bond strength under moisture exposure was more strongly pronounced than in the case of adhesive strips which are composed of just one layer of adhesive.

Failure of the bond occurs in the case of a pure peeling load and particularly in the case of a tipping/shearing load (where a torque is active, as in the case, for example, of the bonding of a hook with a particular lever on which something is hung) to a much greater extent than in the case of a pure shearing load.

DE 102 24 842 A1 describes an adhesive based on styrene block copolymers that by virtue of addition of super-absorbents possesses significantly improved holding power on hydrophilic substrates such as glass under moisture conditions. Nevertheless, the bonding performance in the case of long-lasting, very high atmospheric humidity, but especially under running water, is inadequate.

U.S. Pat. No. 6,569,521 B describes a redetachable adhesive strip with a strong, extensible carrier and an adhesive based on silicones, especially block copolymers of silicones and polyureas. This product can be removed from the substrate again by pulling in the bond plane; the bond strength to glass at 98% relative humidity is increased significantly in relation to that of adhesives based on styrene block copolymers. A disadvantage is that, owing to the stretching of the entire product, the only adhesives that can be used are those for which the bond strength is greatly reduced under extension.

For a large number of pressure-sensitive adhesives (PSAs), the bonding performance subsides considerably under the influence of high atmospheric humidity or water. Not only is it the case that damp or wet adhesive strips adhere much less well or even not at all, or that they are difficult to bond to wet substrates, but also existing bonds of an adhesive tape on a substrate can be impaired in their load-bearing capacity, or even fail completely, under the influence of humidity or water. This phenomenon is particularly pronounced in the case of hydrophilic substrates such as glass or ceramic products such as tiles. Ceramic tiles in particular are often found in bathrooms or kitchens, where for short periods the atmospheric humidity can rise very sharply. Hydrophilic substrates possess the property of often having a very thin layer of adsorbed water bound on the surface, which can be removed only at very high temperatures. As a result of this thin layer of water, it is very easy for moisture or water to be picked up by the glass. Owing to the molecular structure of the glass, it is even capable of taking water into the glass itself and not only of absorbing it on the surface. Similar considerations apply to ceramic products too.

If an adhesive tape is bonded to ceramic products or glass, a thin layer of water remains between the adhesive tape and the glass. This layer is so thin that the bonding properties of the adhesive tape are unaffected; the bond between adhesive tape and glass can be very strong, similar to that between steel and the same adhesive tape.

If moisture in the form of high atmospheric humidity or water acts on the bond, the layer of water between glass and adhesive strip may pick up further water, which causes the layer to grow. Water may also diffuse through the glass to the bond area. Consequently the bond performance is reduced to such an extent that it can lead to the bond failing.

In order to prevent this failure of the bond it is standard practice to use very soft adhesives which are able to close off all of the pores in the glass, so that the water is no longer able to diffuse into the intermediate layer. This route is taken, for example, in connection with the adhesive bonding of laminated glass sheets, where an isobutyl rubber adhesive is employed (according to Skeist, "Handbook of Adhesives", 2nd edition, 1977).

An alternative to the very soft adhesives based on isobutyl rubbers are adhesives based on silicones or silicone-containing polymers. A disadvantage is that these adhesives frequently do not loose bond strength to a sufficient extent when stretched, to allow them to be removed from a surface.

In contrast to this, silicone compositions can frequently be peeled effectively from the substrate to which they have been bonded.

It is an object of the invention to develop a redetachable adhesive strip with adhesives that are formulated on a relatively broad formulating basis, said adhesive strip having a high bond strength even on hydrophilic substrates under high atmospheric humidity, and even under running water, but also being removable again without residue.

SUMMARY OF THE INVENTION

The invention accordingly provides a redetachable, at least single-sidedly pressure-sensitive adhesive strip composed at least of the following layers:
a.) a core layer which has a breaking extension of at least 300%, preferably of at least 450%,
b.) an outer carrier layer which has a breaking extension of not more than 120%, preferably 80%, and which at least sectionally is connected to the core layer such that it separates from the core layer when the latter is extensionally stretched,
c.) a first adhesive layer which is applied at least sectionally to the side of the outer carrier layer that is opposite the side connected to the core layer.

DETAILED DESCRIPTION

In a first advantageous embodiment of the invention the core layer is formed from an adhesive which is redetachable by extensional stretching especially in the bond plane.

As a highly stretchable core layer it is possible to employ adhesives which are both pressure-sensitively adhesive and non-pressure-sensitively adhesive—which, for example, must be activated thermally.

The thickness of the core layer comprising the adhesive is preferably between 300 and 1500 µm.

With further preference the core layer protrudes beyond the outer carrier layer at least in one region. This region serves as a grip tab, at which pulling takes place in order to obtain the extensional stretching especially in the bond plane of the core layer, and it is therefore preferably made nonadhesive on both sides, especially by the application of pieces of film, foil or paper.

In another advantageous development the region can be generated by irradiation, powdering or neutralization of the adhesive. Alternatively a varnish or primer may be applied at the corresponding points.

The surface can then be modified by chemical treatment such as etching in order in each case to produce nonadhesive zones.

In a further advantageous development of the invention, the adhesive of the core layer is constructed on the basis of styrene block copolymers.

Adhesives of this kind are described for example in DE 42 33 872 A1 or in DE 195 11 288 A1 and are available commercially as teas Powerstrips®.

In a further advantageous embodiment of the invention the core layer is formed by a carrier which is redetachable by extensional stretching especially in the bond plane.

With further preference a further adhesive layer is applied at least sectionally on the side of the carrier that is opposite the side connected to the outer carrier layer.

Between carrier and outer carrier layer there is advantageously a second adhesive layer which preferably has the same composition as the further adhesive layer.

Furthermore, it ought to be possible to reduce the bond strengths of the second adhesive layer and of the further adhesive layer by extensional stretching especially in the bond plane, in order to obtain an adhesive strip of particularly advantageous design.

With further preference the carrier protrudes beyond the outer carrier layer at least in one region. This region serves again as a grip tab, on which adhering takes place in order to obtain the extensional stretching especially in the bond plane of the core layer.

In a further advantageous embodiment of the invention the carrier is composed of foam, in particular of homopolymers and copolymers of ethylene, in particular of low-density and very low-density polyethylenes (LDPE, LLDPE, VLDPE), of ethylene-vinyl acetate copolymers and also of mixtures of aforementioned polymers and/or of films of polyvinyl acetates, polypropylenes, polyurethanes based on aromatic and aliphatic diisocyanates, polystyrene, impact-modified polystyrenes, PVC, acrylate copolymers.

The foams can be employed in crosslinked or noncrosslinked form.

The thicknesses of the foams used are in particular between 175 µm and 10 mm, preferably between 250 µm and 5 mm, more preferably between 350 µm and 3 mm. The densities may be 20 to 400 $kg/m^3$, preferably 25 to 250 $kg/m^3$, more preferably from 25 to 150 $kg/m^3$. The foam structure may be closed-cell, open-cell or mixed-cell. Skinned or unskinned foams of integral or nonintegral structure may be utilized. In accordance with the invention it is likewise possible to employ laminates of two or more foams.

To generate sufficient anchorage of the PSAs employed on the foams the latter are advantageously subjected to a pretreatment during production and/or prior to their coating with PSA. Suitable pretreatment techniques include fluorine pretreatment, corona pretreatment, plasma pretreatment, and flame pretreatment, the latter in particular by means of an electrically polarized flame. Pretreatment methods may be applied alone or in combination. In the case of skinned foams and in the case of integral foams, the foam may be primer-treated in order further to improve the anchorage of adhesive. Open-cell and mixed-cell foams may be subjected to impregnation.

The foam carriers may be subjected to pretreatment or injury by means, for example, of perforating, cutting or punching. Such pretreatment may be carried out before or after the coating with adhesive. The result of the pretreatment is, in particular, incisions in the foam-containing carrier, or the extraction of material from the foam-containing carrier, thereby reducing the mechanical strength of the carrier.

Examples of corresponding pretreatments are incisions, punches and perforations. These may cover the whole area of the foam-containing carriers or else be present in confined regions. They may have a regular structure and/or repetition sequence or be irregular.

A distinction may be made between pretreatments where the original form of the foam-containing carrier materials is retained, and those where, as a result of removal of material (extractive punching, for example) or as a result of thermal treatment (melting, for example), regions free of material are produced, in the form for instance of hole-like or channel-like openings in the carrier. Incisions and also regions free of material may penetrate the foam-containing carrier only partly or else completely, or alternatively be present in a hybrid form. They may be made on one side or on both sides into the foam-containing carrier.

Between the foam and PSAs it is possible optionally to integrate a barrier layer in order to reduce the travel of migratable materials between PSAs and foam.

An assembly comprising second adhesive, further adhesive, and carrier, consisting of a highly stretchable, strong carrier and two identical adhesives which loose their bond strength on extensional stretching, is described in WO 92/11333 A1, for example. In an inventive development, that assembly can be utilized as a basis in an adhesive strip of the invention.

With further preference the first adhesive layer is based on silicone and in particular is crosslinked. This achieves optimum bond strengths on hydrophilic substrates, even under humid and wet conditions.

The adhesive may be composed of a silicone-containing polymer and/or a silicone resin. In this context it is possible to employ blends of silicone resins and silicone rubbers, and also reaction products of the two, through condensation crosslinking or addition crosslinking, for example.

With regard to the resins it is possible to employ those based on $R_3SiO_{1/2}$ and $SiO_{4/2}$, but there may also, in addition, be monomers of the form $R_2Si_{2/2}$ or $RSiO_{3/2}$ present, as described, for example, in U.S. Pat. No. 2,676,182 A, U.S. Pat. No. 3,627,851 A or U.S. Pat. No. 5,110,890 A.

Silicone polymers may be constructed on the basis of polydimethylsiloxanes or polydiphenylsiloxanes. The use of block copolymers of silicones and polyureas is also possible. These block copolymers may be obtained from polyorganosiloxanediamines and diisocyanates.

For the crosslinking of the silicone polymers and of the silicone resins there are in principle two methods available. In the case of condensation crosslinking, silanol-containing silicone polymers react with silanol-containing resins either by addition of a catalyst or as a result of increased temperature.

For the addition crosslinking, silicone polymers containing alkenyl groups are crosslinked with silicone resins containing either silicone-bonded hydrogen or alkenyl groups, through the use of platinum catalysts.

The silicone adhesives may comprise fillers or pigments, as elucidated in detail below.

In a further advantageous embodiment of the invention there is, at least sectionally, a second outer carrier layer on the core layer and/or on the further adhesive layer which separates from the core layer or from the further adhesive layer when the latter is extensionally stretched, and which is preferably provided at least sectionally on the free side with a third adhesive layer. The second outer carrier layer as well preferably has a maximum breaking extension of 120%, especially 80%.

On extensional stretching of the core layer, the outer carrier layers separate therefrom, and there remain two single-sidedly bonded adhesive strips on the respective substrate, which can be peeled off.

With further preference the outer carrier layer and the second outer carrier layer and/or the first and the third adhesive layers are identical.

The adhesive of the core layer, the further adhesive and/or the third adhesive are preferably composed of block copolymers or of a mixture thereof, especially including polymer blocks formed from vinyl aromatics (A blocks) and those formed by polymerization of 1,3-dienes (B blocks).

Advantageously the vinyl aromatics are styrene and/or the B blocks are formed by polymerization of butadiene and/or isoprene and/or their hydrogenation products or by polymerization of isobutylene.

Resultant block copolymers may comprise identical or different B blocks, which may be hydrogenated partly, selectively or completely. The block copolymers may have a linear A-B-A structure. It is likewise possible to employ block copolymers of radial design and also star-shaped and linear multiblock copolymers. A further component present may be A-B diblock copolymers. Block copolymers of vinyl aromatics and isobutylene can likewise be employed. All of the aforementioned polymers may be utilized alone or in a mixture with one another.

In lieu of styrene-butadiene block copolymers and styrene-isoprene block copolymers and their hydrogenation products, thus styrene-ethylene/butylene block copolymers and styrene-ethylene/propylene block copolymers, it is likewise possible to employ block copolymers and their hydrogenation products that utilize further polydiene-containing elastomer blocks, such as, for example, copolymers of two or more different 1,3-dienes. Use may additionally be made of functionalized block copolymers, where the block copolymer is a maleic anhydride-modified or silane-modified styrene block copolymer Typical use concentrations for the block copolymer are situated in a concentration in the range between 20% and 70% by weight, in particular in the range between 30% and 60% by weight and in the range of 35% and 55% by weight.

Further polymers present may be those based on pure hydrocarbons, for example, unsaturated polydienes such as naturally or synthetically generated polyisoprene or polybutadiene, substantially chemically saturated elastomers such as, for example, a saturated ethylene-propylene copolymer, an α-olefin copolymer, a polyisobutylene, a butyl rubber, an ethylene-propylene rubber or a chemically functionalized hydrocarbon such as a halogen-containing, acrylate-containing or vinyl ether-containing polyolefin, which may replace the vinyl aromatic-containing block copolymers at up to about 100 phr (parts per hundred parts of resin), based on the styrene block copolymer.

Adhesives based on natural rubber can also be employed.

The adhesive may be crosslinked by chemical means, in particular by radiation chemical means, as for example by UV irradiation, γ irradiation or by irradiation using rapid electrons.

The adhesives of the present invention are optionally those whose pressure-sensitive adhesiveness is generated only by thermal or solvent activation.

The tackifier is a tackifier resin which is compatible with the elastomer block of the styrene block copolymers. Suitable tackifier resins include, among others, preferably unhydrogenated, partially hydrogenated or fully hydrogenated resins based on rosin or on rosin derivatives, hydrogenated polymers of dicyclopentadiene, unhydrogenated, partially, selectively or fully hydrogenated hydrocarbon resins based on $C_5$, $C_5/C_9$ or $C_9$ monomer streams, polyterpene resins based on α-pinene and/or β-pinene and/or δ-limonene, a hydrogenated polymer of pure $C_8$ or $C_9$ aromatics. Aforementioned tackifier resins may be used both alone and in a mixture.

The mixture preferably comprises at least one additive. To stabilize the adhesives it is typical to add antioxidants. Additives may be primary or secondary antioxidants; primary antioxidants employed in particular include sterically hindered phenols, and secondary antioxidants employed in particular include phosphites or thiols. C-radical scavengers may be added.

As an additive it is also possible, however, to use light stabilizers such as, for example UV absorbers or sterically hindered amines. The addition may likewise take place of antiozonants, metal deactivators, processing assistants or end block-reinforcing resins.

Further possible additives may be plasticizing agents. Plasticizing agents may be liquid resins, plasticizer oils or low molecular mass liquid polymers which possess a low molecular mass polyisobutylene having a molar mass <1500 g/mol or a liquid EPDM (ethylene/propylene-diene terpolymer) type having a maximum proportion of 20% by weight.

Fillers, such as, for example, silicon dioxide, glass (ground or in the form of beads), aluminum oxide, zinc oxide, calcium carbonate, titanium dioxide or carbon black, to name but a few, and also color pigments and dyes, and also optical brighteners, may likewise be used.

The outer adhesives, in other words the first adhesive, the third adhesive layer if appropriate, the further adhesive, and the core layer, when the latter is composed of an adhesive, may be provided with an easy-release liner. Suitable for lining the further adhesive and also the core layer is a paper or a film of siliconization; for the first or third adhesive, a fluorosiliconization is advisable.

The following layer thicknesses have proven advantageous:
the outer carrier layer(s): up to 100 µm, especially 20 to 100 µm.
the first, second, third, and further adhesives: 20 to 100 g/m$^2$.

Unless noted otherwise, the breaking extension measurements are made by a method based on DIN 53504, using dumbbell specimens of size S3 and a separation speed of 300 mm/min.

In view of the properties outlined, the adhesive strip of the invention can be used with outstanding effects to bond an article to a hydrophilic surface.

With particular advantage, in accordance with the method below, two substrates bonded with the adhesive strip of the invention can be separated by stretching the core layer in the direction of the bond plane, and doing so more particularly starting from the region which has been made nonadhesive, until the core layer releases from at least one of the outer carrier layers, so that the two substrates are separated from one another and on at least one of the two substrates an outer carrier layer is additionally bonded, and the outer carrier layer together with the first adhesive layer is peeled from the other substrate at an angle of removal of greater than 45°.

Using the below-described figures and examples, particularly advantageous embodiments of the invention are illustrated, without any intention thereby to subject the invention to unnecessary restriction.

BRIEF DESCRIPTION OF THE DRAWINGS

In FIG. 1 the pressure-sensitive adhesive strip 10 of the invention is shown, wherein the core layer 1 is composed of an adhesive which is redetachable by extensional stretching especially in the bond plane.

The core layer 1 protrudes beyond the outer carrier layer 4 at least in a region which serves as a grip tab, which is pulled in order to obtain the extensional stretching especially in the bond plane of the core layer 1. This region is made non-adhesive on both sides by the application of preferably siliconized pieces of film, foil or paper 6.

The outer carrier layer 4 is connected to the core layer 1, owing to the adhesive character of said core layer 1, in such a way that is separates from the core layer 1 when the latter is subjected to extensional stretching.

Applied over the full area of the outer carrier layer 4 is a first adhesive layer 5, in particular a pressure-sensitive silicone adhesive, specifically on the side opposite that connected to the core layer 1.

Figure 2:
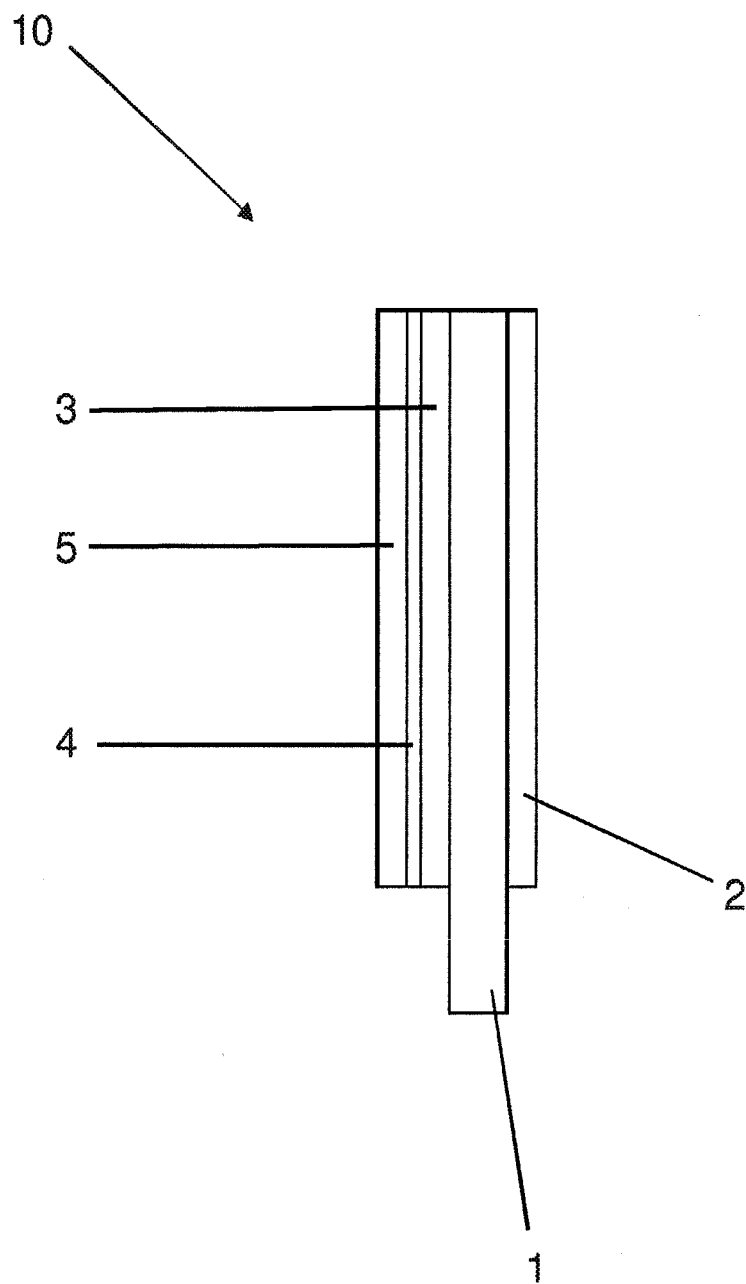
FIG. 2 shows the pressure-sensitive adhesive strip of the invention, wherein the core layer is composed of a carrier.

In FIG. 2 the pressure-sensitive adhesive strip 10 of the invention is shown, wherein the core layer 1 is composed of a carrier which is redetachable by extensional stretching especially in the bond plane.

Connected to the carrier 1 is an outer carrier layer 4, the connection being such that the layer 4 separates from the core layer 1 when the latter is subjected to extensional stretching. The bond is ensured by a second adhesive layer 3.

On the side of the carrier 1 opposite to the side connected to the outer carrier layer 4, the further adhesive layer 2 is applied, and preferably has the same composition as the second adhesive layer 3. Moreover, the bond strengths of the second adhesive layer 3 and of the further adhesive layer 2 can be reduced by extensional stretching especially in the bond plane.

Figure 3:
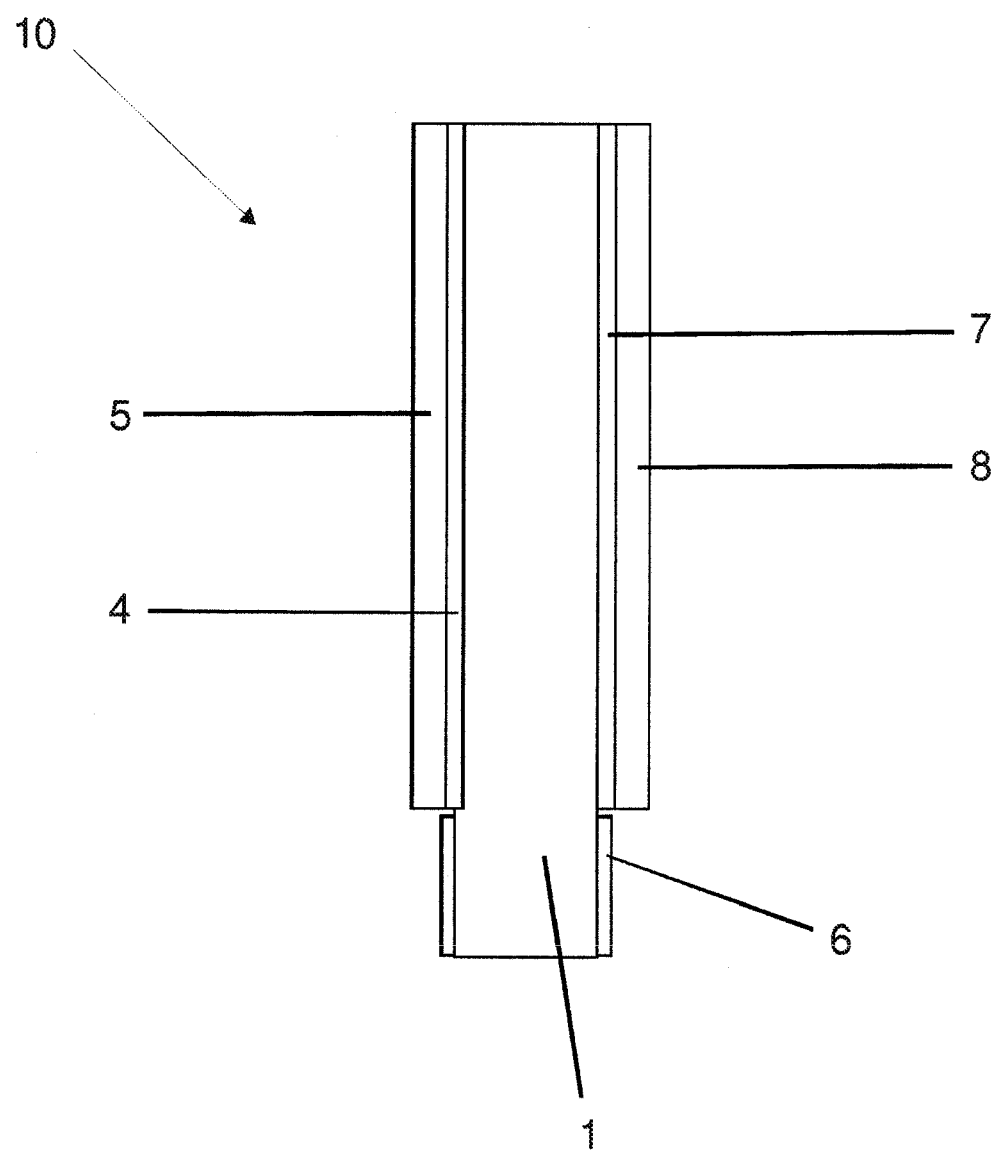
FIG. 3 shows the pressure-sensitive adhesive strip of the invention, wherein the core layer is composed of an adhesive, and which has a second outer carrier layer.

In FIG. 3 the pressure-sensitive adhesive strip 10 of the invention is shown, wherein the core layer 1 is composed of an adhesive which is redetachable by extensional stretching especially in the bond plane. The core layer 1 protrudes beyond the outer carrier layer 4 at least in a region which serves as a grip tab, which is pulled in order to obtain the extensional stretching especially in the bond plane of the core layer 1. This region is made non-adhesive on both sides by the application of preferably siliconized pieces of film, foil or paper 6.

The outer carrier layer 4 is connected to the core layer 1, owing to the adhesive character of said core layer 1, in such a way that it separates from the core layer 1 when the latter is subjected to extensional stretching.

Applied over the full area of the outer carrier layer 4 is a first adhesive layer 5, in particular a pressure-sensitive silicone adhesive, specifically on the side opposite that connected to the core layer 1.

Present on the core layer 1 is a second outer carrier layer 7, which separates from the core layer 1 when the latter is subjected to extensional stretching, and which is provided on the free side with a third adhesive layer 8, in particular a pressure-sensitive silicone adhesive.

Figure 4:
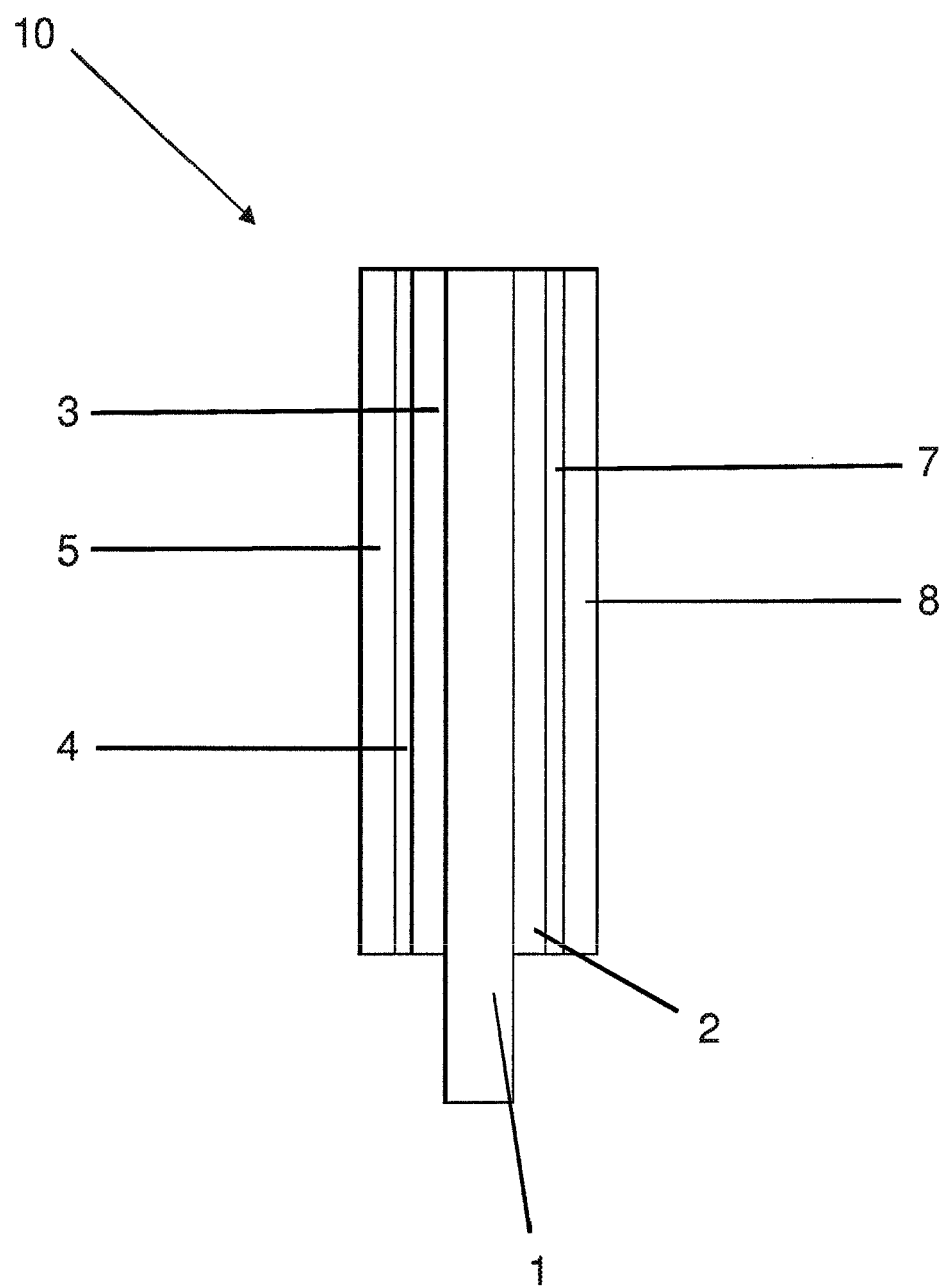
FIG. 4 shows the pressure-sensitive adhesive strip of the invention, wherein the core layer is composed of a carrier, and which has a second outer carrier layer.

In FIG. 4 the pressure-sensitive adhesive strip 10 of the invention is shown, wherein the core layer 1 is composed of a carrier which is redetachable by extensional stretching especially in the bond plane.

On the side of the carrier 1 which is opposite to the side connected to the outer carrier layer 4 the further adhesive layer 2 is applied.

Connected to the carrier 1 is an outer carrier layer 4, the connection being such that the layer 4 separates from the core layer 1 when the latter is subjected to extensional stretching. The bond is ensured by a second adhesive layer 3, which preferably has the same composition as the further adhesive layer 2.

Present on the further adhesive layer 2 is a second outer carrier layer 7 which, on extensional stretching of the core layer 1 or of the further adhesive layer 2, separates therefrom, and which is provided on the free side with a third adhesive layer 8, in particular a pressure-sensitive silicone adhesive.

Figure 1:
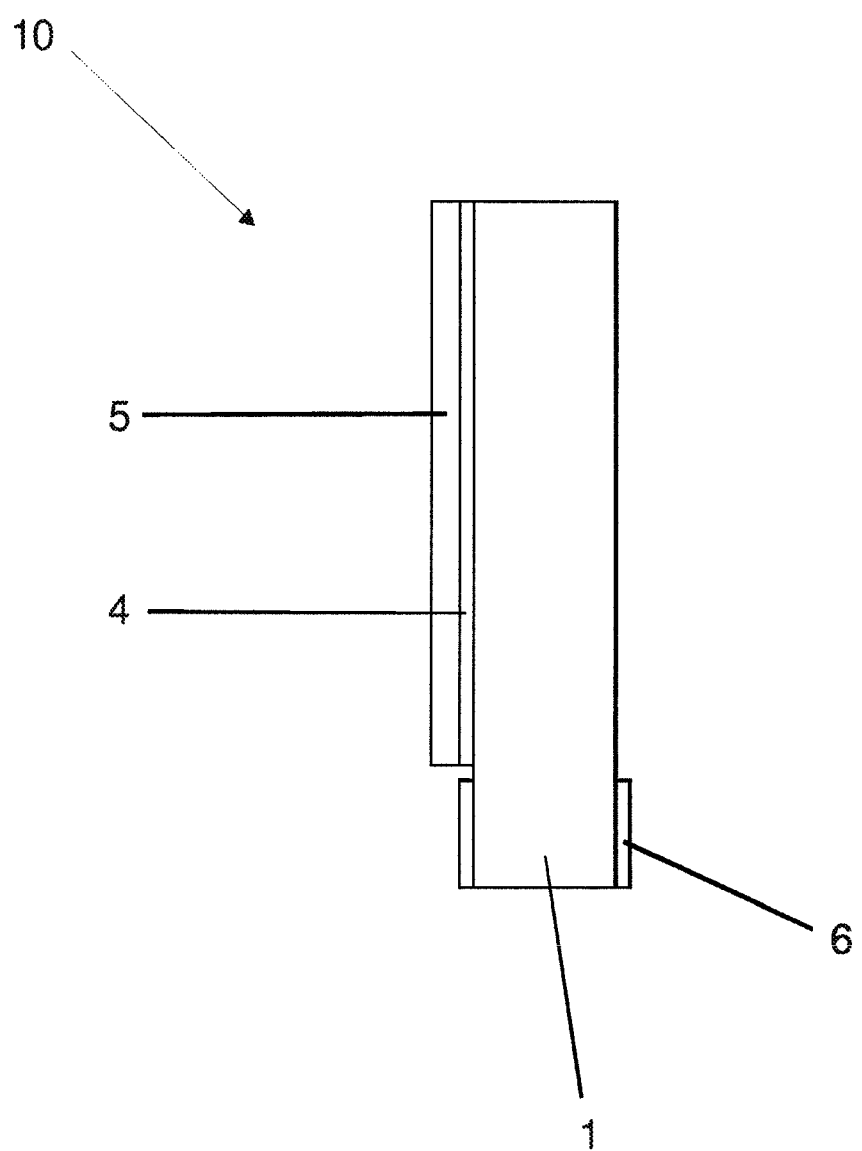
FIG. 1 shows the pressure-sensitive adhesive strip of the invention, wherein the core layer is composed of an adhesive.
Figure 5:
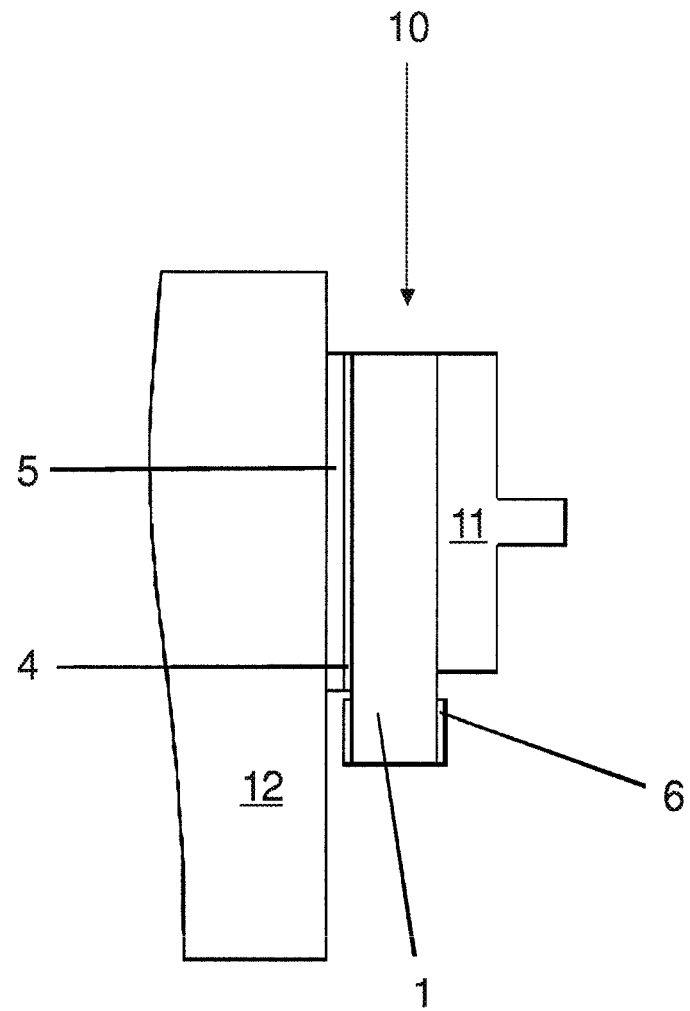
FIG. 5 shows how an article is bonded with an adhesive strip according to FIG. 1 to a hydrophilic substrate.

FIG. 5 shows how an article 11 is bonded with an adhesive strip 10 according to FIG. 1 to a hydrophilic substrate 12. The article 11 is a hook. It is important that the first adhesive layer 5, in particular a pressure-sensitive silicone adhesive, is located on the substrate.

Figure 6:
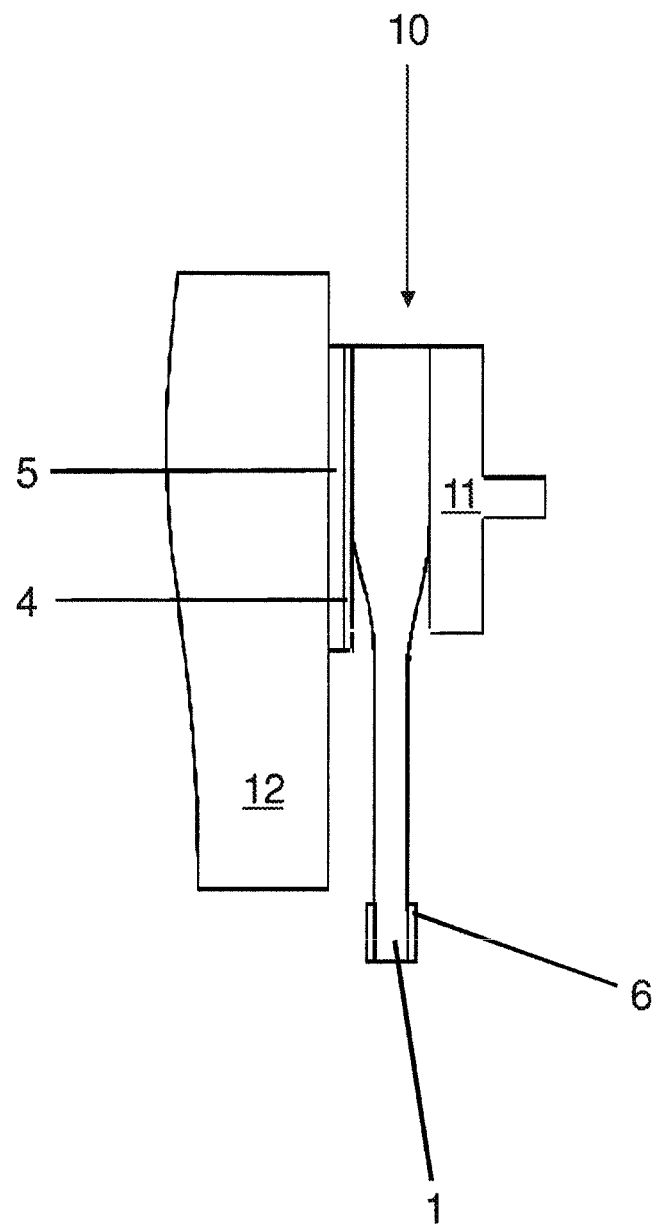
FIG. 6 shows the first step in the method for detaching the article bonded with the pressure-sensitive adhesive strip.

FIG. 6 shows the first step in the method for detaching the article 11 bonded with the pressure-sensitive adhesive strip 10.

First of all the grip tab of the core layer 1 is pulled in the direction of the bond plane, leading to stretching of the core layer 1. Owing to the stretching, the core layer loses bond strength, and thus parts from the outer carrier layer 4, which by virtue of the first adhesive 5 continues to remain bonded to the substrate 12.

At the same time the pressure-sensitive adhesive strip 10 parts from the article 11.

The stretching of the core layer 1 is continued until separation of the core layer 1 from the outer carrier layer 4 and from the article 11 is complete.

Figure 7:
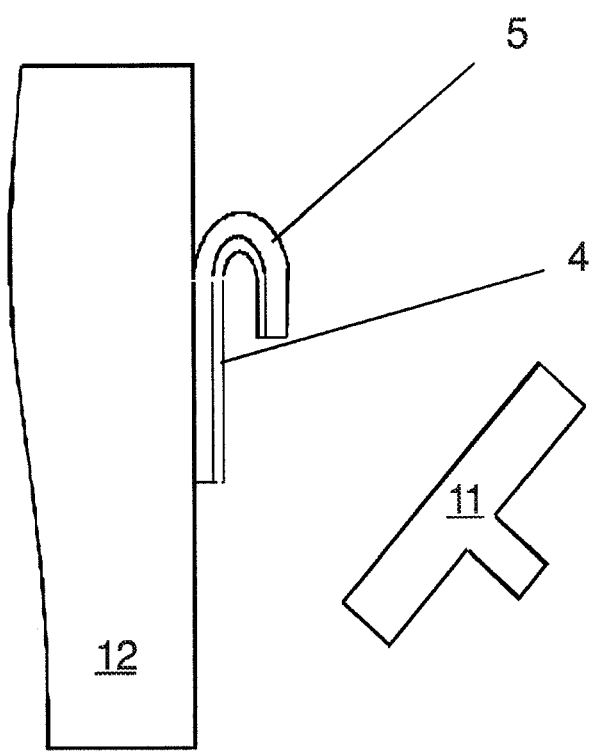
FIG. 7 shows the second step in the method for detaching the article bonded with the pressure-sensitive adhesive strip.

FIG. 7 shows the second step in the method for detaching the article 11 bonded with the pressure-sensitive adhesive strip 10.

To detach the outer carrier layer 4, it is peeled, along with the first adhesive layer 5, from the substrate 12 at an angle of removal of greater than 45°.

Residues of adhesive remain neither on the substrate 12 nor on the article 11.

EXAMPLES

Preparation of the Adhesive for Forming the Core Layer, the Further Adhesive, and the First and Third Adhesives The preparation and processing of the adhesives may take place from solution and also from the melt. Fabrication from the melt has proven advantageous for the further adhesive and for the adhesive for forming the core layer, while fabrication from solution is preferred for the first and third adhesives.

Converting

Typical converted forms of the pressure-sensitive adhesive strips of the invention are adhesive-tape rolls and adhesive strips, of the kind obtained in the form of diecuts, for example.

Preferably all of the layers have essentially the shape of a rectangular block. With further preference all of the layers are connected to one another over their full area.

For the purposes of this invention the general expression "adhesive tape" encompasses all sheetlike structures such as two-dimensionally extended sheets or sheet sections, tapes with extended length and limited width, tape sections, diecuts, labels, and the like.

Example 1

1.8% by weight of the catalyst SYL-OFF 4000™ from Dow Corning Corporation is mixed with 98.2% by weight of Dow Corning 7657 polydimethylsiloxane adhesive solution and the mixture is coated out onto a PET film with a thickness of 36 µm and dried at 140° C. for 10 min. After drying, the thickness of the adhesive layer is 60 g/m². The film thus coated is cut to appropriate size and then adhered by its uncoated side to the following adhesive strip in such a way that the grip-tab region remains free.

Composition:
51.5 parts by weight of linear SIS triblock copolymer having a block polystyrene content of 29% by weight and a hardness, measured by the Shore A method, of 60 (Vector 4211)
47.0 parts by weight of partly hydrogenated aromatic $C_9$ hydrocarbon resin having a Ring & Ball softening point of 100° C. (Regalite S 260)
1.0 part by weight of phenolic antioxidant (Irganox 1010)
0.5 part by weight of light stabilizer (polymeric sterically hindered amine)

The ingredients are kneaded at 160° C. in a Sigma-blade mixer until homogeneous. The resulting pressure-sensitive hot-melt adhesive is coated at 160° C. in a coat thickness of 410 µm from a slot die onto a double-sidedly siliconized release film 80 µm thick and composed of monoaxially oriented polypropylene.

The resulting bale product (consisting of double-sided pressure-sensitive adhesive tape with single-sided release-film liner) is processed to sheet product (adhesive strips) on a unit consisting of two laminating stations, a delaminating station, two further laminating stations, a longitudinal slitting device, and a separation unit (format punch). For this purpose, a 20 mm wide and 15 µm thick polyethylene terephthalate film is laminated centrally onto the releasefilm-free side (front face) of 120 mm width at the first laminating station. At the second laminating station, siliconized polyethylene release film in a width of 120 mm is laminated on in such a way that the release film projects beyond the adhesive by 2.5 mm on either side. Following the release-film lining of the reverse face at a delaminating station, the same linings (20 mm wide polyethylene terephthalate film centrally, 125 mm wide siliconized polyethylene film over the full area with a 2.5 mm projection on either side) are performed for the reverse face. Separation to form sheet product with a length of 62.5 mm and a width of 19 mm is accomplished by means of slitting (in longitudinal direction) and by diecutting by a format diecutter.

The ring-and-ball method is the customary method for ascertaining softening points. Details can be taken from ASTM E 28 and DIN EN 1238, hereby incorporated by reference.

The resulting adhesive assembly is adhered with the silicone adhesive side to a vertical glass wall and pressed on with a force of 100 N. Bonded to the Powerstrips side is a steel hook with dimensions of 4×2 cm, projecting vertically from which there is a pin to which a weight can be affixed. The bond is made such that the grip tab of the Powerstrip projects from the adhesive joint. Subsequently a weight of 500 g is hung on the above-described pin at a distance of 30 mm from the wall.

Comparative Example

As described in example 1, an adhesive strip as per claim 1 is bonded without additional outer carrier layer and adhesive, and the pin is loaded with the same weight.

In the case of both examples, 10 min after adhesive bonding, the atmospheric humidity in the room is increased to 85% relative humidity. While the unimproved strip often falls off even within the first hour, the adhesive strip from example 1 continues to hold after several days.

The adhesive strip from example 1 can be parted again without problems. This is done by pulling on the grip tab of the core layer, the detachment force being comparable with that of a normal adhesive bond with the adhesive strip without an additional outer carrier layer and adhesive. In the process of parting by extensional stretching, the core layer parts from the PET film, which remains with the silicone composition on the tab. This can then be peeled off easily without leaving residues on the glass.

The invention claimed is:

1. A method of separating two substrates bonded in a bond plane with a redetachable, pressure-sensitive adhesive strip, the adhesive strip bonded between the two substrates, comprising:
   a) a core layer which has a breaking extension of at least 300%,
   b) an outer carrier layer which has a breaking extension of not more than 120% and which is connected to the core layer such that it separates from the core layer when the core layer is extensionally stretched, and
   c) a first adhesive layer which is applied to the side of the outer carrier layer that is opposite the side connected to the core layer;
   the method comprising:
      stretching the core layer in the bond plane, starting from a region which has been made nonadhesive, until the core layer releases from the outer carrier layer so that the two substrates are separated from one another and at least one of the two substrates remains bonded to the outer carrier layer via the first adhesive layer, and
      peeling the outer carrier layer together with the first adhesive layer from the other substrate at an angle of removal of greater than 45°.

2. The method of claim 1, wherein the core layer is formed from an adhesive which is redetachable by extensional stretching in the bond plane.

3. The method of claim 1, wherein the core layer protrudes beyond the outer carrier layer at least in one region.

4. The method of claim 3, wherein the protruding region is made nontacky by the application of pieces of film, foil or paper.

5. The method of claim 2, wherein the adhesive of the core layer is constructed on the basis of styrene block copolymers.

6. The method of claim 1, wherein a further adhesive layer is applied on the side of the core layer that is opposite the side connected to the outer carrier layer.

7. The method of claim 6, wherein between core layer and outer carrier layer there is a second adhesive layer which has the same composition as the further adhesive layer.

8. The method of claim 7, wherein the bond strengths of the second adhesive layer and of the further adhesive layer can be reduced by extensional stretching in the bond plane.

9. The method of claim 8, wherein the core layer protrudes beyond the outer carrier layer at least in one region.

10. The method of claim 8, wherein the core layer is comprised of at least one of:
    a foam selected from the group consisting of low-density and very low-density polyethylenes (LDPE, LLDPE, VLDPE), ethylene-vinyl acetate copolymers and mixtures of aforementioned polymers; or
    films selected from the group consisting of polyvinyl acetates, polypropylenes, polyurethanes based on aromatic and aliphatic diisocyanates, polystyrene, impact-modified polystyrenes, PVC, and acrylate copolymers.

11. The method of claim 1, wherein the first adhesive layer is based on silicone and is crosslinked.

12. The method of claim 1, wherein on the core layer there is a second outer carrier layer which separates from the core layer when the core layer is extensionally stretched, and wherein the second outer carrier layer is optionally provided with a third adhesive layer on the free side thereof.

13. The method of claim 12, that wherein at least one of: the outer carrier layer and the second outer carrier layer; or the first and the third adhesive layers, are identical.

14. The method of claim 13, wherein at least one of: the core layer, or the third adhesive, comprise block copolymers including at least one of: polymer blocks formed from vinyl aromatics (A blocks); or polymer blocks formed by polymerization of 1,3-dienes (B blocks).

15. The method of claim 14, wherein at least one of: the vinyl aromatics are styrene; or the B blocks are formed by polymerization of at least one of: butadiene, isoprene, hydrogenation products of butadiene or isoprene, or isobutylene.

* * * * *